(12) United States Patent
Iwata

(10) Patent No.: US 11,316,771 B2
(45) Date of Patent: Apr. 26, 2022

(54) NON-TRANSITORY COMPUTER-READABLE STORAGE MEDIUM STORING REQUEST PROCESSING PROGRAM, REQUEST PROCESSING METHOD, AND INFORMATION PROCESSING DEVICE

(71) Applicant: FUJITSU LIMITED, Kawasaki (JP)

(72) Inventor: Satoshi Iwata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/113,140

(22) Filed: Dec. 7, 2020

(65) Prior Publication Data

US 2021/0273873 A1    Sep. 2, 2021

(30) Foreign Application Priority Data

Feb. 27, 2020    (JP) .............................. JP2020-031946

(51) Int. Cl.
*H04L 43/16*    (2022.01)
*H04L 43/0876*    (2022.01)

(52) U.S. Cl.
CPC .......... *H04L 43/16* (2013.01); *H04L 43/0876* (2013.01)

(58) Field of Classification Search
CPC .............................. H04L 43/16; H04L 43/0876
See application file for complete search history.

(56) References Cited

U.S. PATENT DOCUMENTS 9,942,118 B1 *    4/2018  Muhammad ........ H04L 41/0813
2003/0204794 A1 *  10/2003  Barrett .................... H04L 1/242
                                                          714/704

FOREIGN PATENT DOCUMENTS

JP         H10-283276 A      10/1998
JP         2012-198714 A     10/2012

* cited by examiner

*Primary Examiner* — Andrew C Georgandellis
(74) *Attorney, Agent, or Firm* — Fujitsu Patent Center

(57) ABSTRACT

Provided is a computer-readable storage medium storing a program causing a first information processing device connected to a second information processing device to execute a process, the process including receiving requests having timestamps added by the second information processing device, storing, as a first time, a first latency for which a cumulative frequency in a first frequency distribution, which is obtained by counting the requests for each latency, is equal to a threshold value, processing the requests received within the first time, discarding the request having a latency greater than the first time, and changing the first time to a second latency for which a cumulative frequency in a second frequency distribution different from the first frequency distribution is equal to the threshold value depending on whether a ratio of discarded requests is greater than a target value calculated by subtracting the threshold value from 1.

10 Claims, 18 Drawing Sheets

NON-TRANSITORY COMPUTER-READABLE STORAGE MEDIUM STORING REQUEST PROCESSING PROGRAM, REQUEST PROCESSING METHOD, AND INFORMATION PROCESSING DEVICE

CROSS-REFERENCE TO RELATED APPLICATION

This application is based upon and claims the benefit of priority of the prior Japanese Patent Application No. 2020-031946, filed on Feb. 27, 2020, the entire contents of which are incorporated herein by reference.

FIELD

A certain aspect of embodiments described herein relates to a non-transitory computer-readable storage medium storing a request processing program, a request processing method, and an information processing device.

BACKGROUND

In systems for online auctions and online stock trading, a user terminal transmits a request packet tor placing an order to the system. To treat users fairly, it is preferable for the processing server in the system to process request packets in order of arrival at the system.

However, request packets do not always arrive at the processing server in the order the request packets arrived at the system because of the network delay in the system or other causes. Therefore, suggested is a method in which the processing server stores the request packets in a buffer for a predetermined queuing time, sorts the request packets stored in the buffer in order of arrival at the system, and then processes the sorted request packets.

In this method, the requests that arrive at the processing server after the queuing time are discarded by the processing server. The number of requests to be discarded can be reduced by increasing the queuing time. However, this increases the response time it takes for the processing server to execute the process according to the request from the arrival of the request at the system.

By contrast, when the queuing time is decreased to reduce the response time, the number of requests that cannot arrive within the queuing time increases, which results in the increase in the number of requests to be discarded. Note that the technique related to the present disclosure is also disclosed in Japanese Laid-Open Patent Publication No. 2012-198714.

SUMMARY

According to an aspect of the embodiments, there is provided a non-transitory computer-readable storage medium storing a request processing program causing a first information processing device, which is connected to a second information processing device through a network, to execute a process, the process including: receiving requests each having a timestamp added by the second information processing device; storing, as a first time, a first latency for which a cumulative frequency in a first frequency distribution is equal to a threshold value, the first frequency distribution being obtained by counting the requests for each latency, the latency being a difference between a time when the request is received and a time indicated by the timestamp, processing the requests received within the first time in order of time indicated by the timestamp; discarding the request having a latency greater than the first time, and changing the first time to a second latency for which a cumulative frequency in a second frequency distribution is equal to the threshold value depending on whether a ratio of discarded requests among the requests received is greater than a target value calculated by subtracting the threshold value from 1, the second frequency distribution differing from the first frequency distribution.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Prior to the description of the present embodiments, what the inventor studied will be described.

Figure 1:
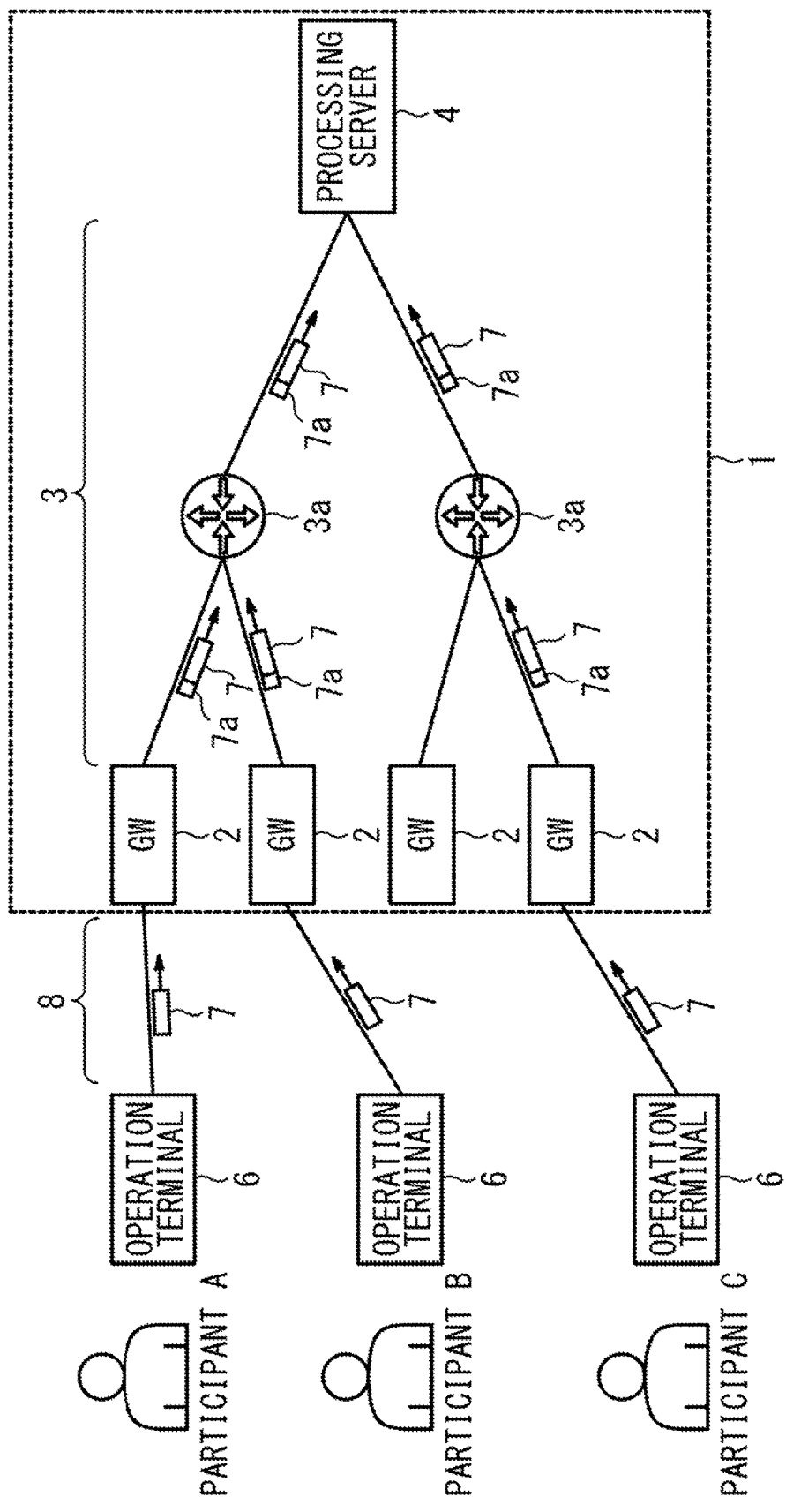
FIG. 1 is a configuration diagram of a system used in the study.

FIG. 1 is a configuration diagram of a system used in the study. A system 1 is a system for online auctions or online stock trading, and includes gateway devices 2, a network 3, and a processing server 4.

The gateway device 2 is a gateway server that receives a request packet 7 transmitted from an operation terminal 6 of each of participants A to C via the Internet 8. Here, a plurality of the gateway devices 2 is prepared to distribute the load and prevent a single point of failure in the system 1. In this case, each operation terminal 6 transmits the request packet 7 to one of the gateway devices 2.

Furthermore, the gateway device 2 adds a timestamp 7a indicating the time when the gateway device 2 received the request packet 7 to the request packet 7, and transmits the request packet 7 including the timestamp 7a to the processing server 4.

The network 3 is a local area network (LAN) connecting, the gateway devices 2 to the processing server 4. A switch 3a may be used to make the network 3 redundant.

The processing server 4 is a computer that executes an order included in the pay load of the request packet 7. The gateway devices 2 and the processing server 4 are synchronized in time through network time protocol (NTP).

The time it takes for the request packet 7 to reach the processing server 4 from the gateway device 2 differs depending on the path through which the request packet 7 passes in the system 1. Therefore, the order the request packets 7 arrive at the processing server 4 does not always correspond to the order the request packets 7 arrived at the gateway device 2.

Thus, the processing server 4 sets a queuing time for the request packets 7 in advance, and sorts the request packets 7 that arrive within the queuing time in the order of the time indicated by the timestamp 7a. After sorting, the processing server 4 executes processes such as order execution in order from the request packet 7 with the earliest time of the timestamp 7a, which results in fair treatment of the participants.

In this case, the request packet 7 having a latency greater than the queuing time is discarded by the processing server 4. To reduce the number of the request packets 7 to be discarded, the queuing time is increased. However, this increases the response tune it takes for the processing server 4 to execute the order from the arrival of the request packet 7 at the system 1, resulting in decrease in the responsiveness of the system 1. The following method could be employed to avoid this problem.

Figure 2:
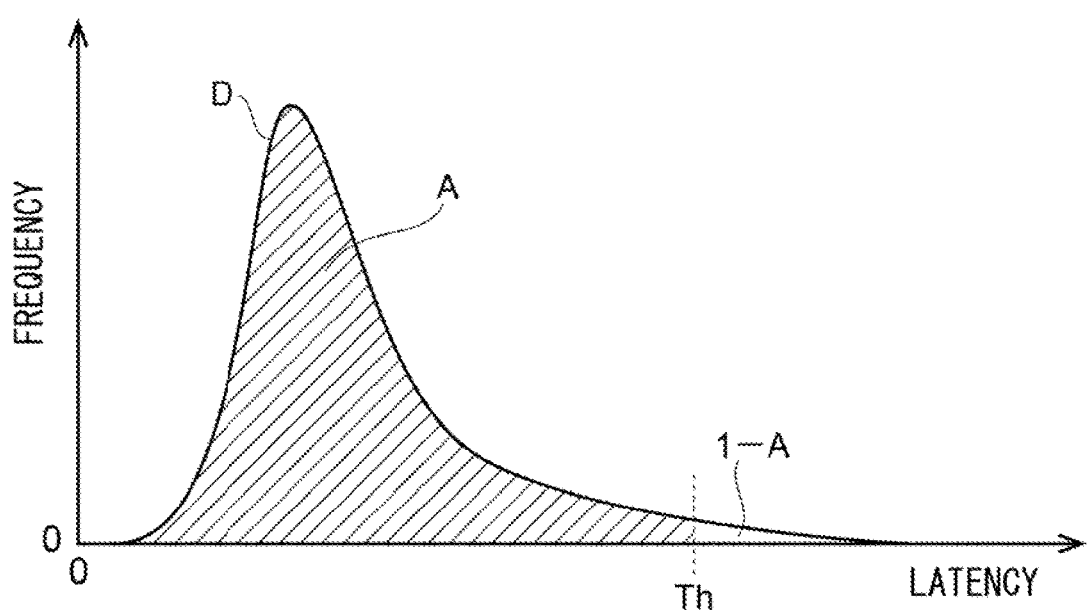
FIG. 2 is a schematic view illustrating a frequency distribution obtained by counting request packets for each latency.

FIG. 2 is a schematic view illustrating a frequency distribution D obtained by counting the request packets 7 for each latency.

Here, the difference $(t_s-t_g)$ between the time $t_s$ when a request packet 7 arrived at the processing server 4 and the time $t_g$ indicated by the timestamp 7a of the request packet 7 is defined as the latency of the request packet 7. According to this definition, the latency includes the delay time in the gateway device 2, the delay time in the network 3, and the delay time in the processing server 4.

In addition, in the example of FIG. 2, a threshold value A is set for the cumulative frequency that is the ratio of the sum of the frequencies for latencies that are less than or equal to a certain latency to the sum of the frequencies for all the latencies. As an example, the threshold value A is 0.999. In addition, the latency for which the cumulative frequency is the threshold value A is set as a queuing time Th. Therefore, among all the request packets 7 arriving at the processing server 4, the percentage represented by the threshold value A of the request packets 7 arrives within the queuing time Th. By contrast, the remaining percentage (1−A) of the request packets 7 is discarded by the processing server 4 because these request packets 7 have latencies greater than the queuing time Th.

When the queuing time Th is determined using the frequency distribution of latencies, the ratio (1−A) of the request packets 7 to be discarded by the processing server 4 among all the request packets 7 can be controlled.

By further advancing this concept, suggested is a method in which the frequency distribution D is generated with respect to each gateway device 2 in advance, and the threshold value A is set for each gateway device 2. This allows the threshold value A to be set in consideration of the latency that differs depending on the gateway devices 2. Thus, the number of the request packets 7 to be discarded by the processing server 4 is controlled more finely.

However, the latency does not only differ depending on the gateway devices 2, but also varies depending on the overall load of the system 1 that varies from time to time. Therefore, the following problem arises in this method.

Figure 3:
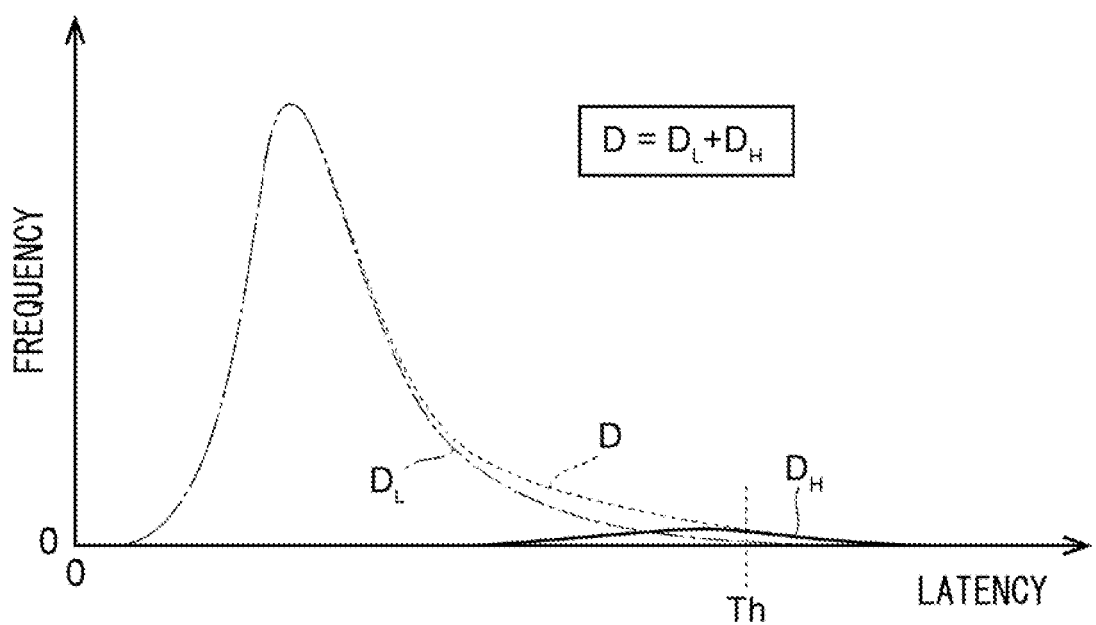
FIG. 3 is a schematic view of the frequency distribution for describing a problem.

FIG. 3 is a schematic view of the frequency distributions D for describing the problem. The frequency distribution $D_t$ in FIG. 3 is the frequency distribution of latencies when the overall load of the system 1 is low. The frequency distribution $D_H$ is the frequency distribution when the overall load of the system 1 is higher than the overall load of the system 1 with which the frequency distribution $D_t$ is obtained.

In this case, the overall frequency distribution D without considering the load of the system 1 as in FIG. 2 is the sum of the frequency distribution $D_t$ and the frequency distribution $D_H$. When the load of the system 1 is high, the latency increases. Thus, the frequency distribution $D_H$ shifts to the higher latency side than the frequency distribution $D_t$.

Here, a case where the latency for which the cumulative frequency in the overall frequency distribution D is the threshold value A is set as the queuing time Th is considered. In this case, the ratio Q of the area of the part further right than the queuing time Th to the total area of the frequency distribution $D_H$ is much greater than 1−A. For example, when the threshold value A is 0.999, 1−A is 0.001, while in the example of FIG. 3, the ratio Q is approximately 0.33.

Therefore, when one frequency distribution D is used without considering the load of the system 1 as in the example of FIG. 2, the approximately 33% of all the request packets 7 is to be discarded when the load is high. The discarded request packets 7 are re-transmitted from the operation terminal 6 of the participant to the system 1. Thus, the load of the system 1 further increases, leading to the vicious circle of increase in the number of the request packets 7 to be discarded.

Hereinafter, embodiments capable of controlling the number of request packets to be discarded in consideration of the load of the system will be described.

First Embodiment

Figure 4:
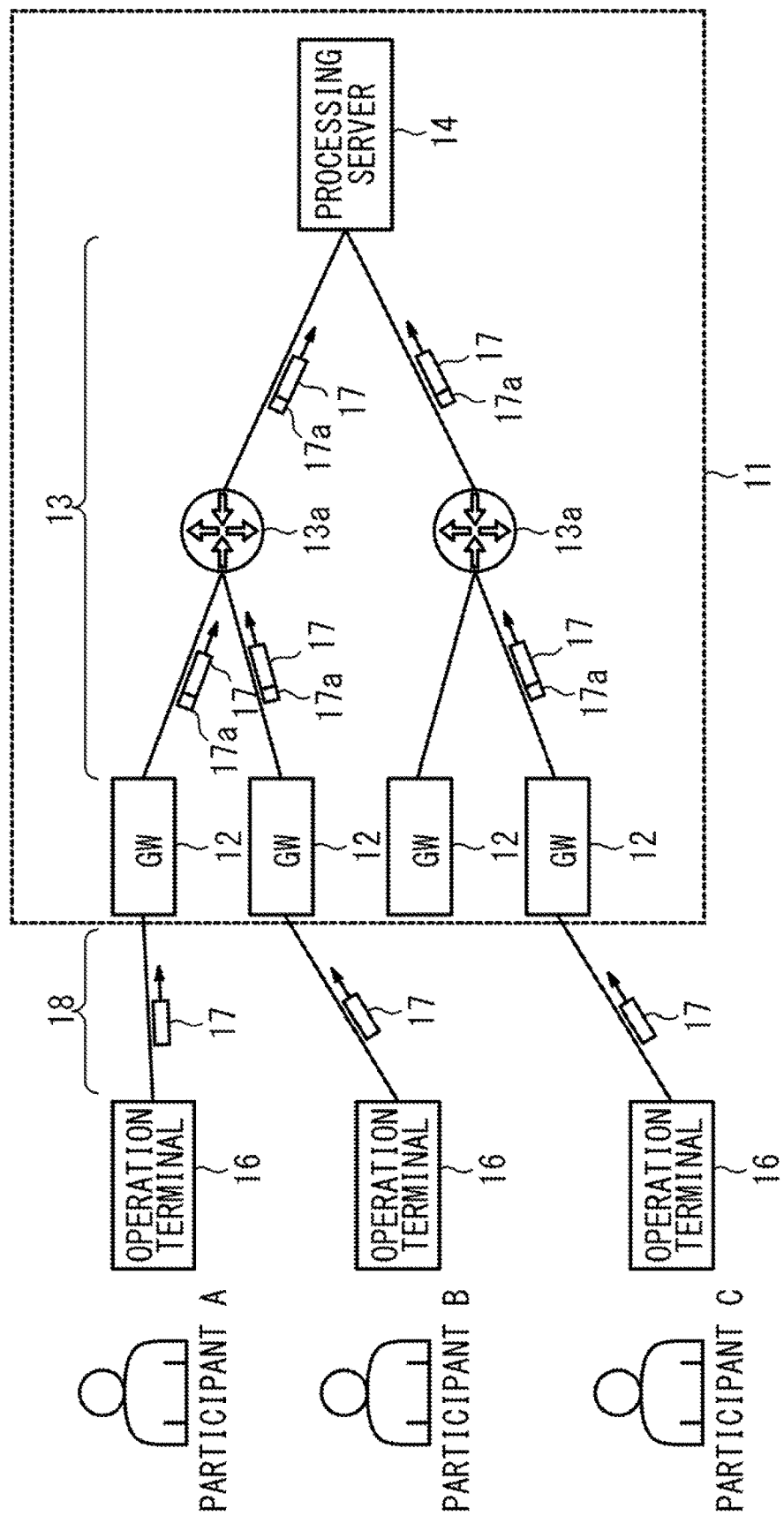
FIG. 4 is a configuration diagram of a system in accordance with a first embodiment.

FIG. 4 is a configuration diagram of a system in accordance with a first embodiment. A system 11 in accordance with the first embodiment is a system for online auctions or online stock trading, and includes gateway devices 12, a network 13, and a processing server 14.

The gateway device 12 is an example of a second information processing device, and is a gateway server that receives a request packet 17 transmitted from each of operation terminals 16 of participants A to C via the Internet 18. The operation terminal 16 is a personal computer (PC) or a smartphone capable of connecting to the Internet 18.

The gateway device 12 adds a timestamp 17a indicating the time when the gateway device 12 received the request packet 17 to the request packet 17, and transmits the request packet 17 including the timestamp 17a to the processing server 14.

Figure 5:
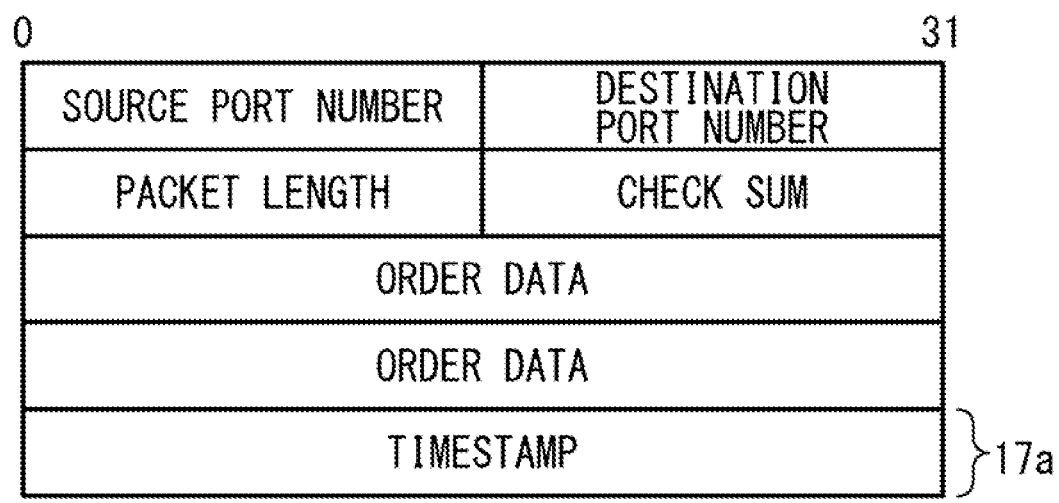
FIG. 5 is a schematic view illustrating a format of a UDP segment in a request packet in accordance with the first embodiment.

FIG. 5 is a schematic view illustrating a format of a user datagram protocol (UDP) segment in the request packet 17.

As illustrated in FIG. 5, in this example, order data indicating the details of the order in the auction or stock trading is stored in 64th to 127th bits of the UDP segment. The gateway device 12 adds the timestamp 17a to 128th to 159th bits of the UDP segment.

The gateway device 12 may add the timestamp 17a to a transmission control protocol (TCP) segment instead of the UDP segment.

FIG. 4 is referred to again. In the first embodiment, to distribute the load and prevent a single point of failure in the system 11, a plurality of the gateway devices 12 is provided in the system 11. In addition, the gateway devices 12 and the processing server 14 are synchronized in time through. NTP or precision time protocol (PTP).

The network 13 is a LAN connecting the gateway devices 12 to the processing server 14. A switch 13a may be used to make the network 13 redundant.

The processing server 14 is an example of a first information processing device, and is a computer that executes a process according to the order data (see FIG. 5) of the request packet 17. Next, the operation of the processing, server 14 will be described.

Figure 6:
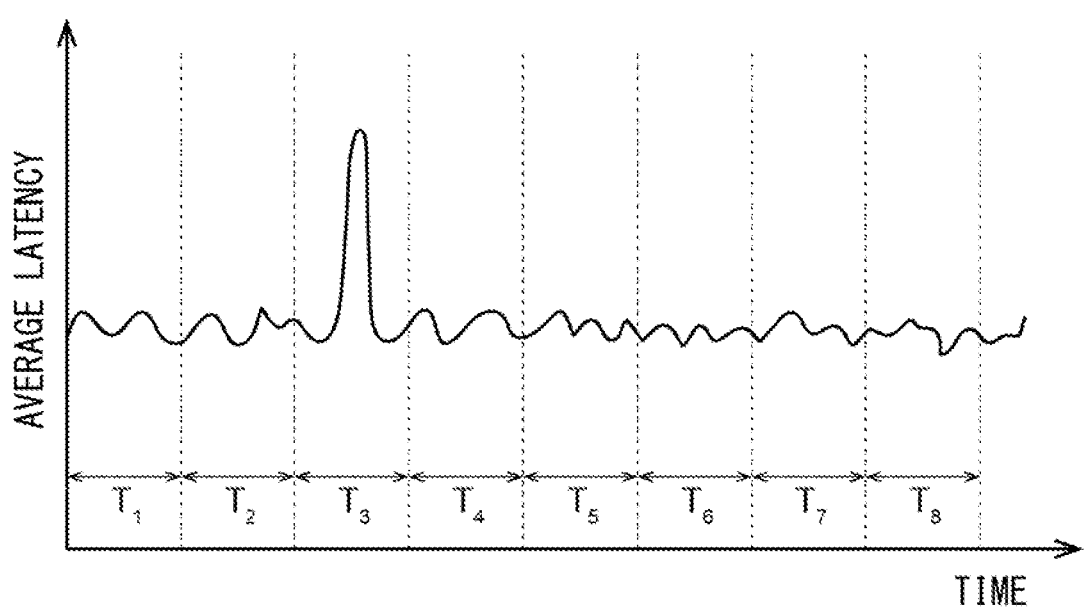
FIG. 6 schematically illustrates temporal variations in the average latency in the system in accordance with the first embodiment.

FIG. 6 schematically illustrates temporal variations in the average latency in the system 11.

As in the example of FIG. 1, the latency of the request packet 17 is the difference $(t_s - t_g)$ between the time $t_s$ when the processing server 14 received the request packet 17 and the time $t_g$ indicated by the timestamp 17a of the request packet 17. The average latency is an average value of the latencies per unit time.

As illustrated in FIG. 6, the average latency varies with time. This is because the overall load of the system 11 including the gateway devices 12, the network 13, and the processing server 14 varies with time.

In this example, the load is concentrated and the average latency thereby rapidly increases in the time period $T_3$ of time periods $T_1, T_2, \ldots$. To prevent increase in the number of the request packets 17 to be discarded by the processing server 14 in the time period $T_3$, the processing server 14 generates a plurality of frequency distributions each corresponding to the degree of the load as follows in this example.

Figure 7A:
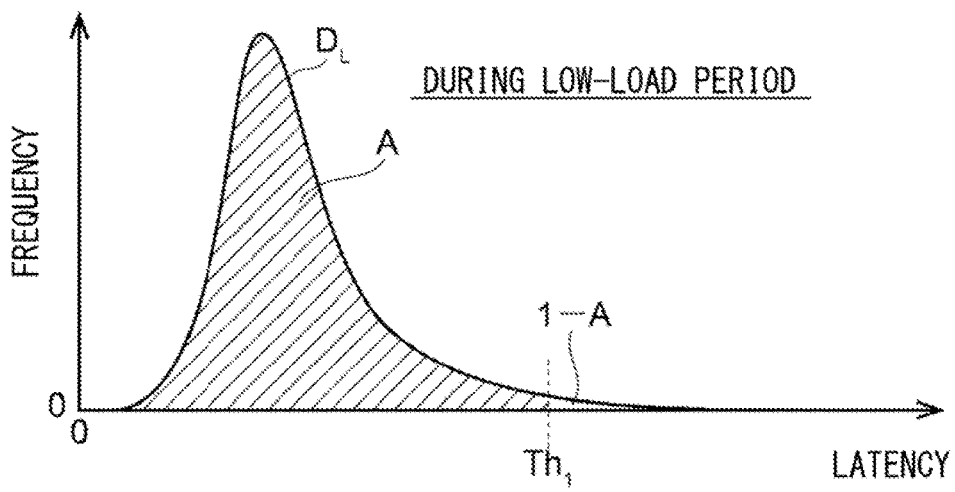
FIG. 7A to FIG. 7C are schematic views illustrating frequency distributions generated by a processing server in accordance with the first embodiment.
Figure 7B:
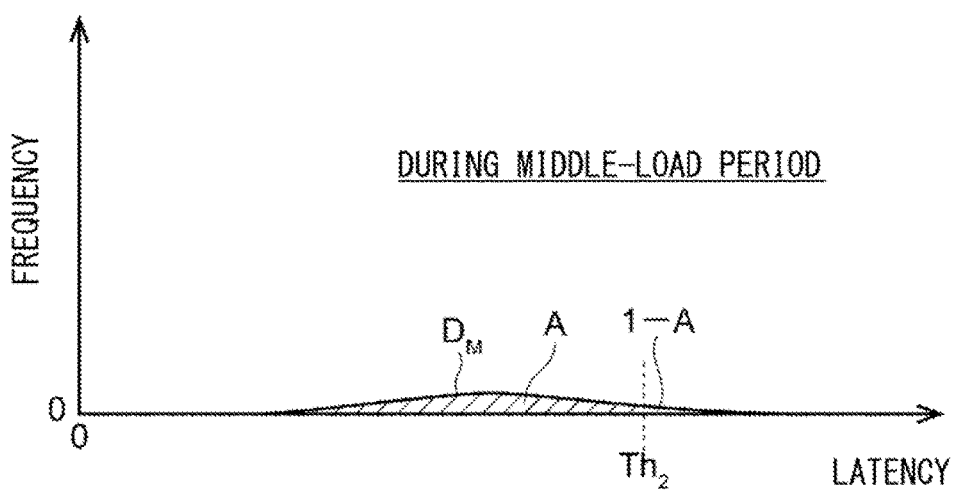
Figure 7C:
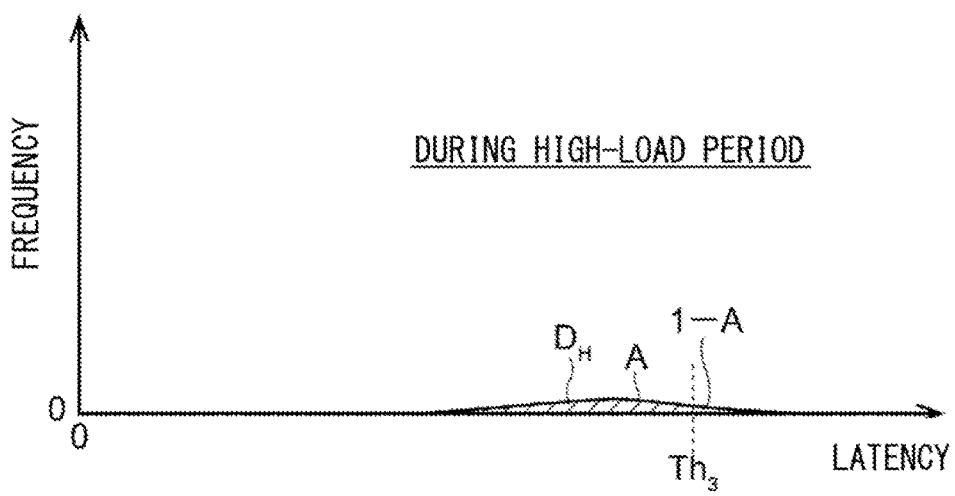

FIG. 7A to FIG. 7C are schematic views illustrating the frequency distributions generated by the processing, server 14.

As illustrated in FIG. 7A to FIG. 7C, in this example, the processing server 14 generates a frequency distribution $D_L$ during the low-load period, a frequency distribution $D_M$ during the medium-load period, and a frequency distribution $D_H$ during the high-load period. Here, any one of the distributions $D_L$, $D_M$, and $D_H$ is an example of a first frequency distribution, and remaining one of the distributions $D_L$, $D_M$, and $D_H$ is an example of a second frequency distribution. Furthermore, the distributions $D_L$ $D_M$, and $D_M$ are examples of third frequency distributions that include the first frequency distribution and the second frequency distributions. Then, the processing server 14 stores the latency for which the cumulative frequency in each of the frequency distributions $D_L$, $D_M$, and $D_H$ is the threshold value A as the queuing times $Th_1$, $Th_2$, and $Th_3$, respectively. Here, any one of the queuing times $Th_1$, $Th_2$, and $Th_3$ is an example of a first latency, and remaining one of the queuing times $Th_1$, $Th_2$, and $Th_3$ is an example of a second latency.

The threshold value A for the cumulative frequency is not particularly limited. In the first embodiment, the threshold value A is set at 0.999 in all the frequency distributions $D_L$, $D_M$, and $D_H$. Since the frequency distribution shifts to the higher latency side as the load increases. $Th_1 < Th_2 < Th_3$.

The method for generating the frequency distributions $D_L$, $D_M$, and $D_H$ is not particularly limited. For example, the processing server 14 generates the frequency distribution D of latencies in the time period $T_1$ by counting the request packets 17 arriving at the processing server 14 within the time period $T_1$. The latency is obtained by the processing server 14 calculating the difference $(t_s - t_g)$ between the time $t_s$ when the processing server 14 received the request packet 17 and the time $t_g$ indicated by the timestamp 17a of the request packet 17.

The processing server 14 generates the frequency distribution D for each of other time periods $T_2, T_3, \ldots$, in the same manner. Thereafter, the processing server 14 classifies the frequency distributions D of the time periods into three classes, that for low load, middle load, and high load, using hierarchical clustering.

For example, the processing server 14 determines whether the average values of two frequency distributions are equal using the t-test, and determines whether the two frequency distributions are the same using the F-test. Then, the processing server 14 classifies the frequency distributions D having the same average value and the same distribution into the same class. When the frequency distributions D are classified into three classes, the classes correspond to the low load, the middle load, and the high load respectively according to the average value of the frequency distribution D representing the class. For example, the class having the smallest average value among three classes corresponds to the low load, and the class having the largest average value corresponds to the high load. The remaining class corresponds to the middle load.

The frequency distributions $D_L$, $D_M$, and $D_H$ respectively illustrated in FIG. 7A to FIG. 7C are examples of the frequency distributions representing the classes of the low load, the middle load, and the high load, respectively.

The length of each time period $T_1, T_2, \ldots$ is not particularly limited, and can be appropriately set according to the characteristics of the system 11. As an example, the length of each time period $T_1, T_2, \ldots$ tens of seconds to tens of minutes.

Figure 8:
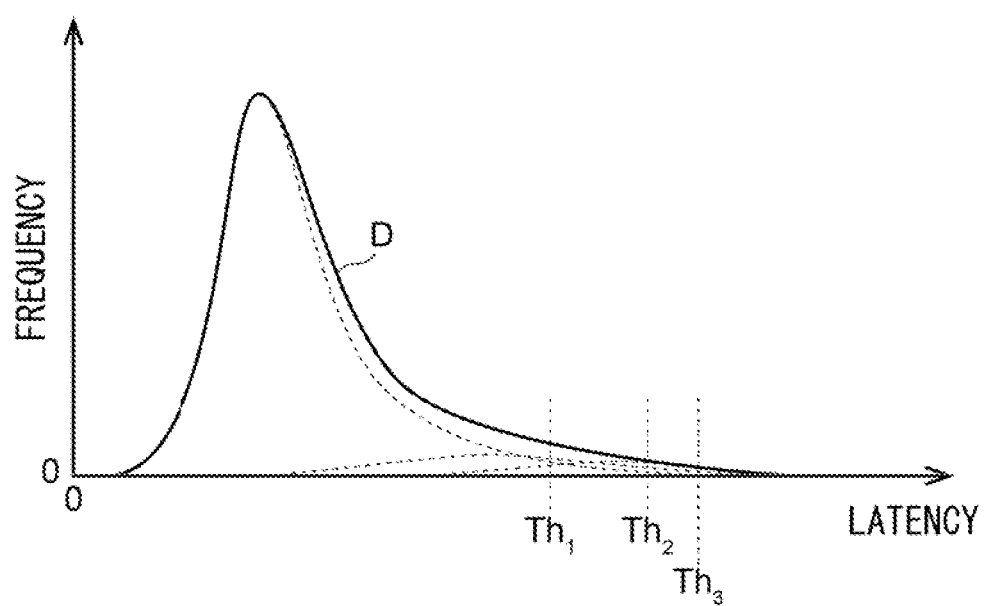
FIG. 8 is a schematic view of frequency distributions obtained during respective time periods in the first embodiment.

FIG. 8 is a schematic view of the frequency distribution D obtained in each of the time periods $T_1, T_2, \ldots$.

The frequency distribution D is a frequency distribution obtained by counting all the request packets 17 received by the processing server 14 during the certain time period for each latency, and is the distribution obtained by combining the frequency distributions $D_L$, $D_M$, and $D_H$.

In the first embodiment, the queuing time is not fixed, and the processing server 14 selects one of the queuing times $Th_1$, $Th_2$, and $Th_3$ according to the load of the system 11 to appropriately control the number of the request packets 17 to be discarded.

Next, the queuing of the request packet 17 will be described.

Figure 9A:
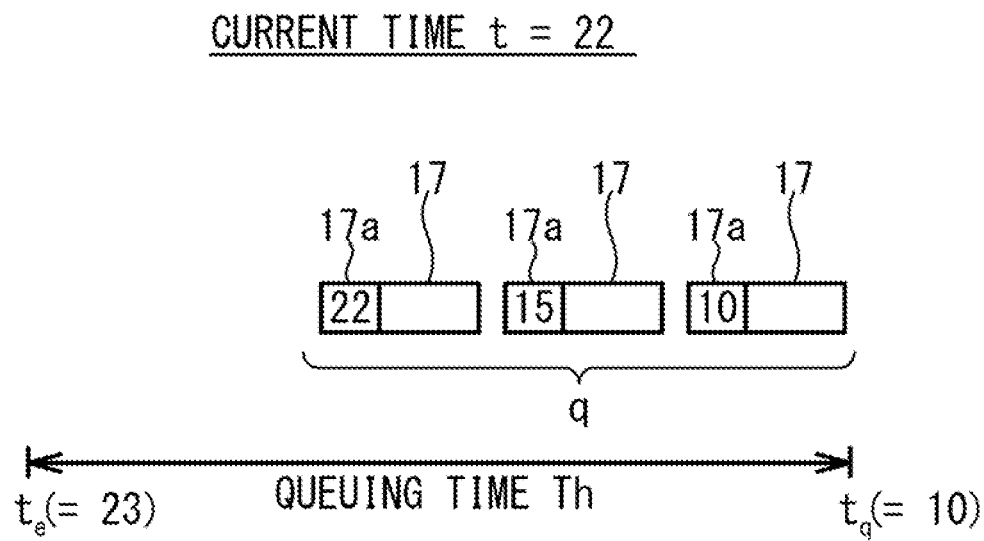
FIG. 9A and FIG. 9B schematically illustrate the queuing of the request packets in the last embodiment.
Figure 9B:
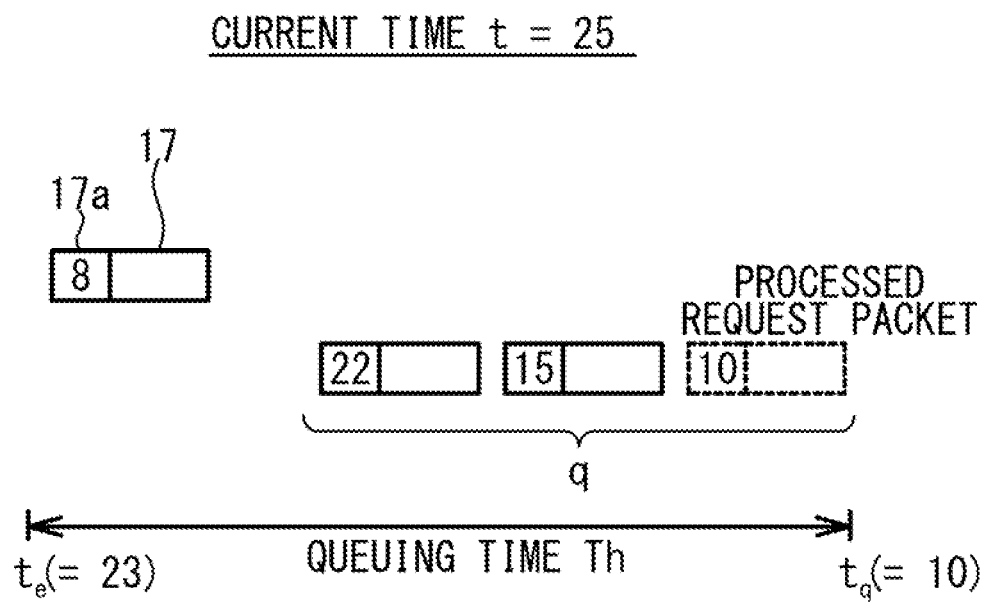

FIG. 9A and FIG. 9B schematically illustrate the queuing of the request packets 17. FIG. 9A schematically illustrates the request packet 17 that was received by the processing server 4 when the current time t was "22". Assume that the queuing time Th "13".

In this example, the request packet 17 of which the time of the timestamp 17a is "10" is already received by the processing server 14. In this case, the start time $t_q$ of the queuing time is "10", which is the time of the timestamp 17a of the request packet 17. The ending time $t_e$ of the queuing time is "23 (=10+13)".

At this point of time, the current time t does not go past the ending time $t_e$. Therefore, the processing server 14 adds the request packet 17 received by the processing server 14 after the starting time $t_q$ of the queuing time to a queue q in the buffer. Then, the processing server 14 sorts the request packets 17 in the queue q so that the request packets 17 are arranged in order starting from the request packet 17 with the earliest time of the timestamp 17a to the request packet 17 with the latest time of the timestamp 17a.

FIG. 9B is a schematic view when the time elapses and the current time t becomes "25" and goes past the ending time "23" of the queuing time.

In this case, the queuing of the request packet 17 that is in the first of the queue q as released, and this request packet 17 is processed by the processing server 14.

Assume that in this point of time, the processing server 14 has received the request packet 17 of which the time of the timestamp 17a is "8". The time "8" precedes the ending time "23" of the queuing time, hut this request packet 17 arrived at the processing server 14 after the ending: time "23", in this case, the processing server 14 discards the request packet 17 of which the time of the timestamp 17a is "8" and requests the source to re-transmit the request packet 17.

Figure 10:
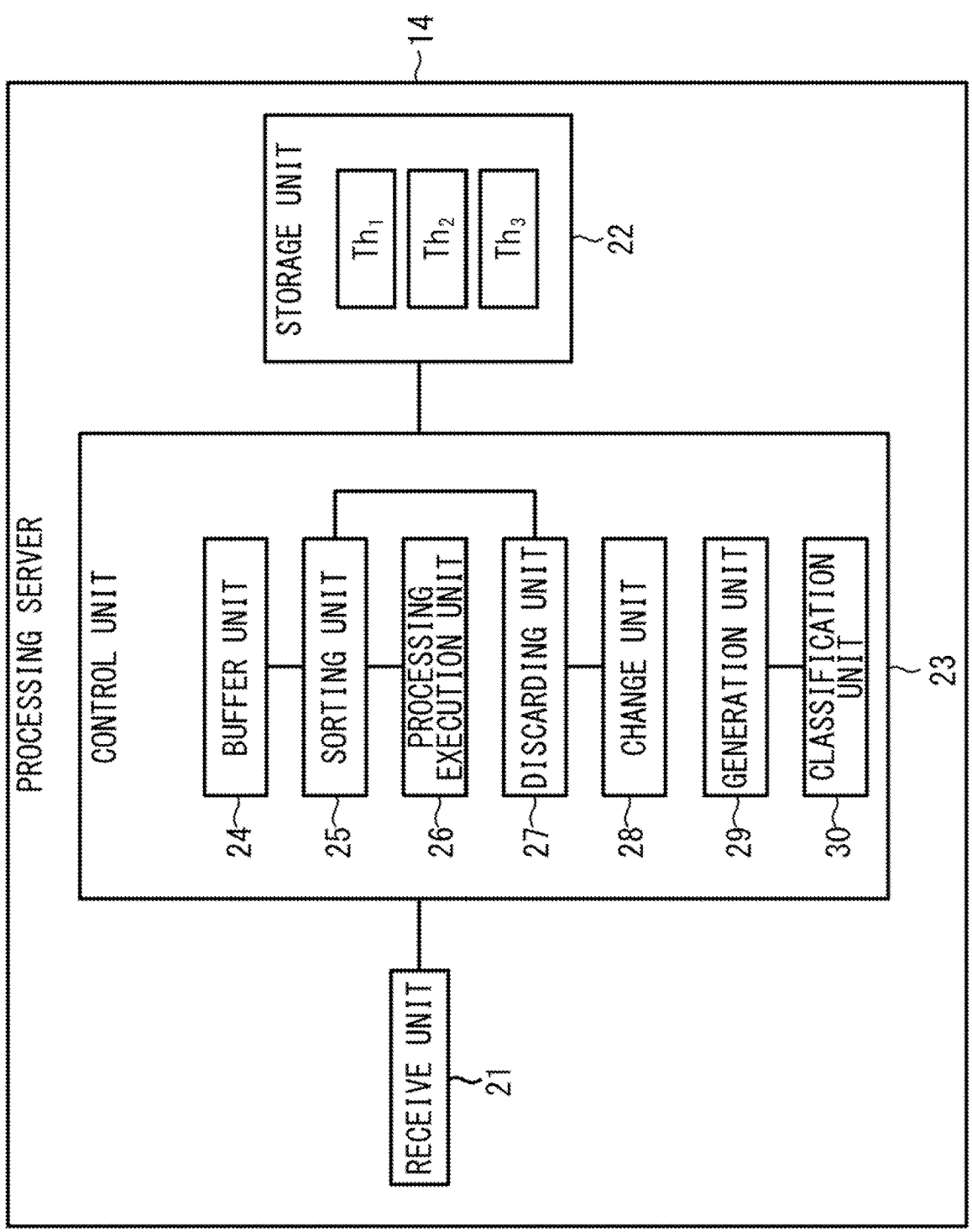
FIG. 10 is a functional block diagram of the processing server in accordance with the first embodiment.

Next, the functional configuration of the processing server 14 in accordance with the first embodiment will be described. FIG. 10 is a functional block diagram of the processing server 14 in accordance with the first embodiment. As illustrated in FIG. 10, the processing server 14 includes a receive unit 21, a storage unit 22, and a control unit 23.

The receive unit 21 is a processing unit that receives a plurality of the request packets 17 each having the timestamp 17a added by the gateway device 12. The storm unit 22 stores three kinds of the queuing times $Th_1$, $Th_2$, and $Th_3$, described above.

The control unit 23 is a processing unit that controls the overall operation of the gateway device 12. In this example, the control unit 23 includes a buffer unit 24, a sorting unit 25, a processing execution unit 26, a discarding unit 27, a change unit 28, a generation unit 29, and a classification unit 30.

The buffer unit 24 is a processing unit that temporarily stores the request packets 17 that arrive within the queuing time. The soiling unit 25 is a processing unit that sorts the request packets 17 stared in the buffer unit 24 in the order of the time of the timestamp 17a and generates the queue q of these request packets 17.

The processing execution unit 26 executes a predetermined process to the request packet 17 that is in the first of the queue q when the current time t goes past the ending time $t_e$ of the queuing time. The processing details are determined by the processing execution unit 26 according to the order data stored in the UDP segment (see. FIG. 5).

The discarding unit 27 is a processing unit that discards the request packet 17 having a latency greater than queuing time.

The change unit 28 is a processing unit that changes the queuing time w when the number of the request packets 17 discarded by the discarding unit 27 is not appropriate. The change unit 28 determines whether the number of the discarded request packets 17 is appropriate using the threshold value A as a reference. For example, when the threshold value A is 0.999, the ratio of the request packets 17 discarded among the request packets 17 received by the processing server 14 is theoretically to be 0.001 (=1−A). The ratio 1−A is a target value for the ratio of the request packets 17 to be discarded among the request packets 17 received by the processing server 14.

When the ratio of the actually discarded request packets 17 is greater than 0.001 (=1−A), which is the target value, this means that the load of the system 11 is increasing, and the currently used queuing time is not appropriate. By contrast, when the ratio of the discarded request packet 17 is less than 0.001 (=1−A), which is the target value, this means that the load of the system 11 is decreasing, and the queuing time is inappropriate also in this case.

Therefore, the change unit 28 changes the queuing time so that the ratio of the request packets 17 to be discarded is closer to the target value 1−A according to the magnitude relationship between the ratio of the request packets 17 discarded by the discarding unit 27 and the target value 1−A.

For example, when the current queuing time is $Th_1$ and the ratio of the discarded request packets 17 becomes greater than the target value 1−A, the change unit 28 changes the queuing time to $Th_2$ or $Th_3$. Additionally, when the current queuing time is $Th_3$ and the ratio of the discarded request packets 17 becomes less than the target value 1−A, the change unit 28 changes the queuing time to $Th_1$ or $Th_2$.

The generation unit 29 is a processing unit that generates the frequency distribution D with respect to each of tire time periods $T_1$, $T_2$, . . . by counting the request packets 17 received by the receive unit 21 for each latency (see FIG. 6).

The classification unit 30 is a processing unit that classifies the frequency distributions D generated by the generation unit 29 into three classes. These classes correspond to the load of the system 11, and the distribution representing the class for low load is the frequency distribution $D_L$ illustrated in FIG. 7A. The distribution representing the class for middle load is the frequency distribution $D_M$ illustrated in FIG. 7B, and the distribution representing the class for high load is the frequency distribution $D_M$ illustrated in FIG. 7C.

Furthermore, the classification unit 30 stores the queuing time $Th_1$, $Th_2$, and $Th_3$ respectively corresponding to the frequency distributions $D_L$, $D_M$, and $D_H$ in the storage unit 22.

Figure 11:
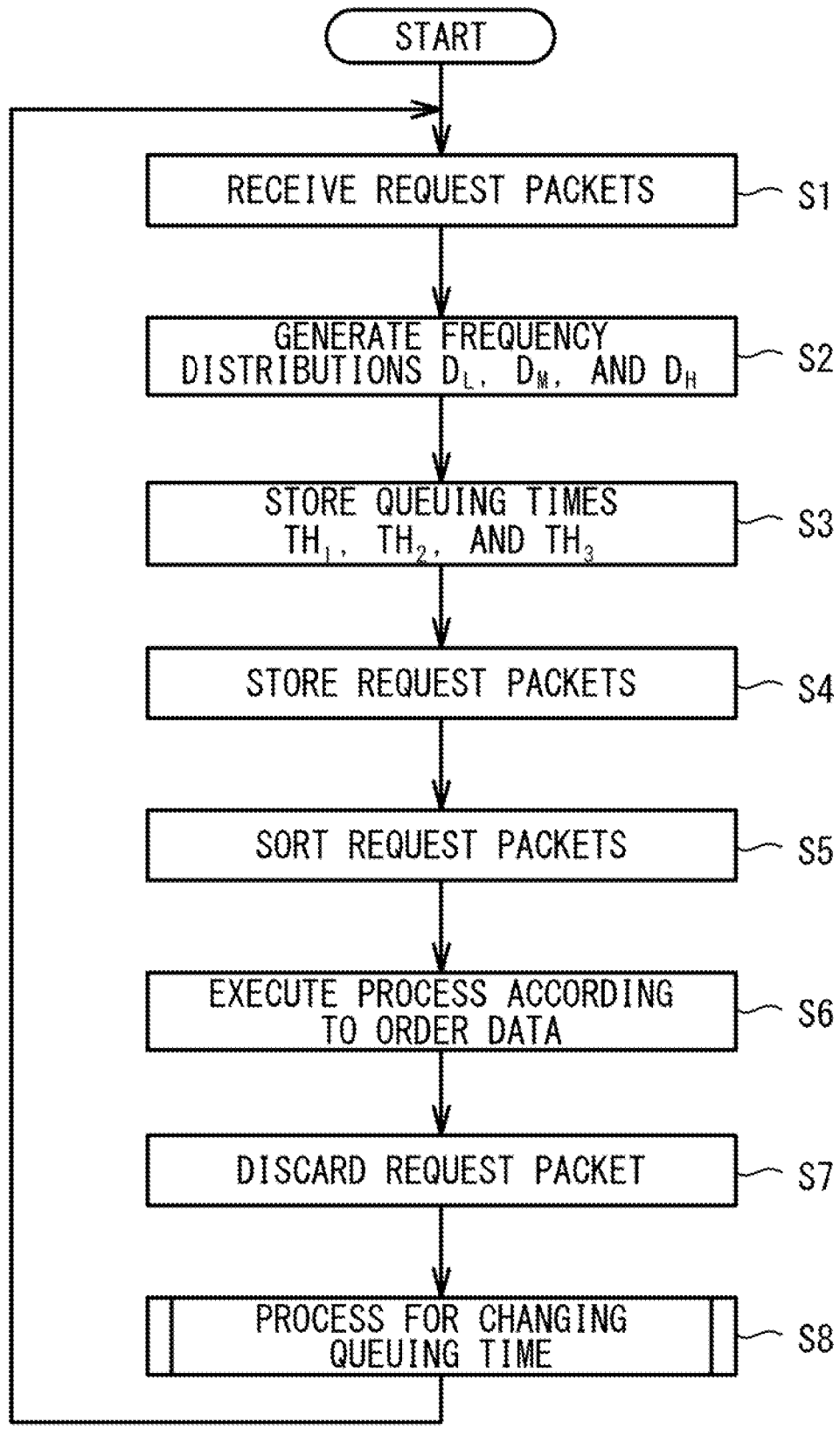
FIG. 11 is a flowchart of a request processing method in accordance with the first embodiment.

Next, the request processing method in accordance with the first embodiment will be described. FIG. 11 is a flowchart of the request processing method in accordance with the present embodiment. First, the receive unit 21 receives a plurality of the request packets 17 (step S1). Then, the generation unit 29 uses these request packets 17 to generate the frequency distributions $D_L$, $D_M$, and $D_H$ illustrated in FIG. 7A to FIG. 7C for each of the time periods $T_1$, $T_2$, . . . (see FIG. 6) (step S2).

Then, the classification unit 30 stores the queuing times $Th_1$, $Th_2$, and $Th_3$ respectively corresponding to the frequency distributions $D_L$, $D_M$, and $D_H$ in the storage unit 22 (step S3). Assume that the queuing time Th is set at one of the queuing times $Th_1$, $Th_2$, and $Th_3$ in the following description.

Then, the buffer unit 24 temporarily stores the request packets 17 received by the receive unit 21 within the queuing time Th among the request packets 17 received in step S1 (step S4). Furthermore, the sorting unit 25 sorts the request packets 17 in the order of the time of the timestamp 17a, and generates the queue q of these request packets 17 (step S5).

The processing execution unit 26 then executes a process according to the order data (see FIG. 5) from the request packet 17 that is in the first of the queue q (step S6).

Then, the discarding unit 27 discards the request packet 17 having a latency greater than the queuing time Th (step S7).

Then, the change unit 28 executes a process for changing the queuing time Th when the number of the discarded request packets 17 is inappropriate (step S8). Thereafter, the process returns to step S1, and the processes of steps S1 to S8 are repeated Next. The process for changing the queuing time in step S8 will be described.

Figure 12:
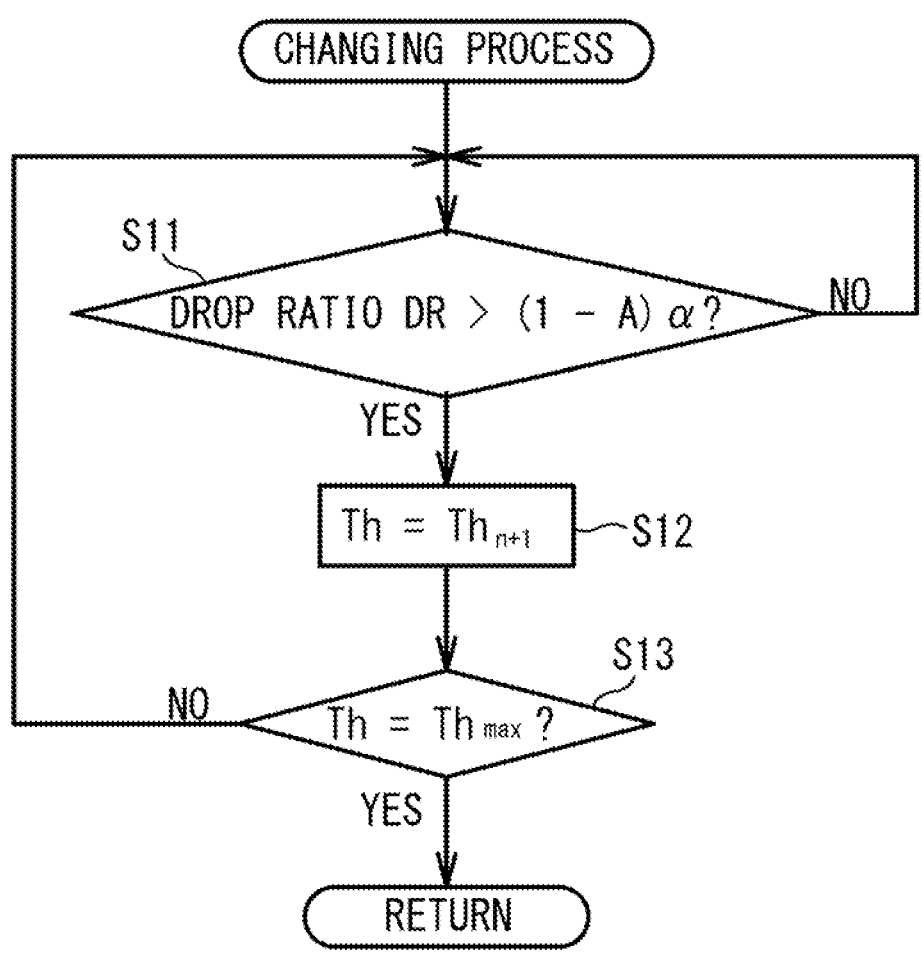
FIG. 12 is a flowchart of a process for changing the queuing time in the first embodiment.

FIG. 12 is a flowchart of the process for changing the queuing time in accordance with the first embodiment.

Hereafter, a case where the threshold value A is 0.999 will be described as an example. In this case, the ratio of the request packets 17 discarded among all the request packets 17 is theoretically to be 0.001 (=1−A), which is the target value. However, in practice, the percentage greater than the target value of the request packets 17 may be discarded depending on the load of the system 11. In this case, the number of the request packets 17 to be discarded is reduced as follows.

First, the change unit 28 determines whether the drop ratio DR is greater than (1−A) $\alpha$ (step S11). The drop ratio DR is the ratio of the discarded request packets the discarding unit 27 among the received request packets 17 by the processing server 14 within a predetermined period. Here, $\alpha$ is a freely-selected coefficient equal to or greater than 1, and is a coefficient for guaranteeing that the request packets 17 are discarded at the ratio sufficiently greater than the target value 1−A. When such a guarantee is unnecessary, $\alpha$ may be set at 1.

When the drop ratio DR is not greater than (1−A) $\alpha$ (step S11: NO), this means that the ratio of the discarded request packets 17 is basically less than the target value 1−A, and excessive discarding has not occurred. In this case, step S11 is repeated.

B contrast, when the drop ratio DR is greater than (1−A)$\alpha$ (step S11: YES), the process proceeds to step S12 to cause the ratio of the request packets 17 to be discarded to be closer to the target value (1−A).

In step S12, the change unit 28 changes the queuing time Th to the time longer than the current queuing time.

As an example, the change unit 28 changes the queuing time to time that has the smallest difference from the current queuing time Th and is greater than the current queuing time among the queuing times $Th_1$, $Th_2$, and $Th_3$. In the first embodiment, $Th_1 < Th_2 < Th_3$. Therefore, when the current queuing time is $Th_n$, the change unit 28 changes the queuing time to $Th_{n+1}$.

Then, the change unit 28 determines whether the queuing time Th after the change is equal to the maximum value $Th_{max}$ among a plurality of queuing times (step S13). In the first embodiment, $Th_3$, which is the maximum value among $Th_1$, $Th_2$, and $Th_3$, is $Th_{max}$.

When the queuing time Th is not equal to the maximum value $Th_{max}$ (step S13: NO), there is room to further increase the queuing time Th. Therefore, step S11 is executed again.

By contrast, when the queuing time Th is equal to the maximum value $Th_{max}$ (step S13: NO), there is no room to further increase the queuing time. Therefore, in this case, the process returns to the calling process.

According to the process for changing the queuing time described above, when the drop ratio DR is greater than (1−A) $\alpha$, the change unit 28 changes the queuing time to the value greater than the current value. This increases the number of the request packets 17 arriving within the queuing time, thereby reducing the number of the request packets 17 to be discarded by the discarding unit 27. Therefore, the number of the request packets 17 to be discarded can be appropriately controlled.

Moreover, in this example, in step S12, among a plurality of the queuing times $Th_1$, $Th_2$, and $Th_3$, the time having the smallest difference from the current queuing time Th is set as the new queuing time. As the queuing time increases, the response time of the system 11 increases. However, the rapid decrease in response time is inhibited by increasing the queuing time Th in steps as described above.

In the example of FIG. 12, the queuing time is changed when the number of the discarded request packets 17 is large, but the queuing time may be also changed when the number of the discarded request packets is small as described below.

Figure 13:
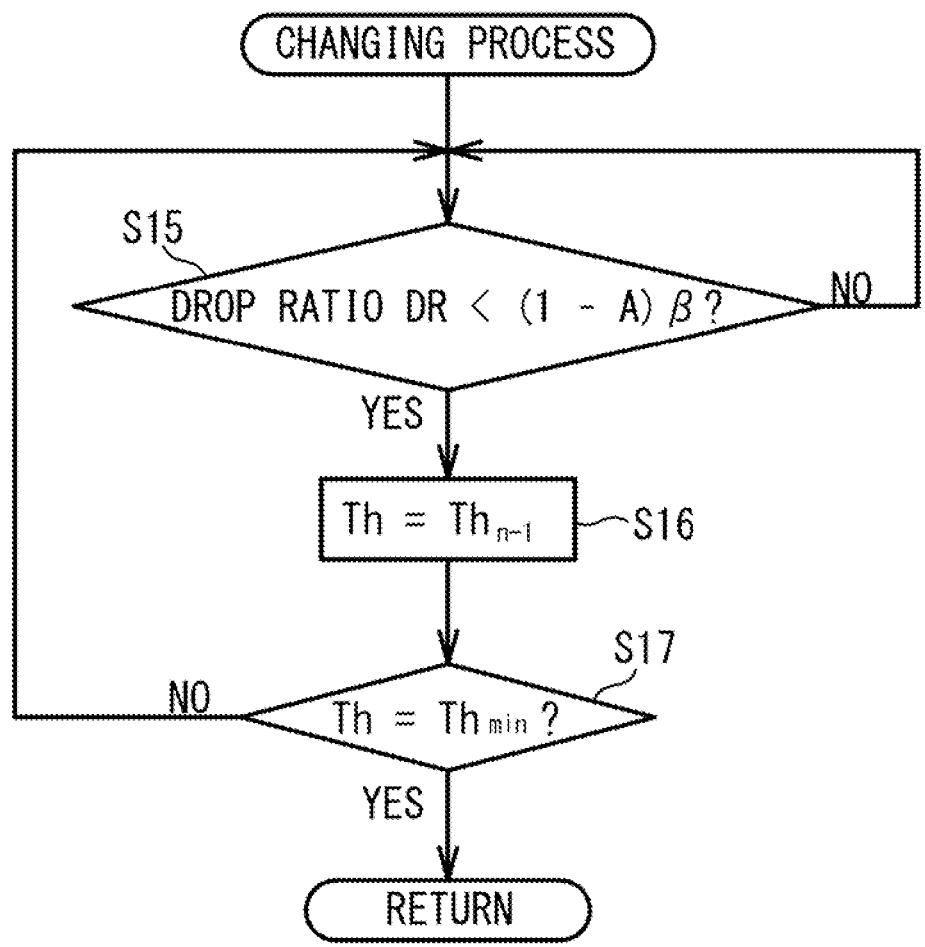
FIG. 13 is a flowchart of another process for changing the queuing time in the first embodiment.

FIG. 13 is a flowchart of another process for changing the queuing time in accordance with the first embodiment.

When the load of the system 11 decreases, the ratio of the discarded request packets 17 may become excessively less than the target value 1−A. In this case, it is preferable to reduce the response time of the system 11 by reducing the queuing time as described below.

First, the change unit 28 determines whether the drop ratio DR is less than (1−A) $\beta$ (step S5). Here, $\beta$ is a freely-selected coefficient equal to or less than 1, and is a coefficient for guaranteeing that the request packets are excessively discarded at the ratio sufficiently less than the target value 1−A. When such a guarantee is unnecessary, $\beta$ may be set at 1.

When it is determined that the drop ratio DR is not less than (1−A) $\beta$ (step S15: NO), this means that the drop ratio DR is basically greater than the target value (1−A). In this case, the number of the discarded request packets 17 is not excessively small Therefore, step S15 is repeated without changing the queuing time.

By contrast, when the drop ratio DR is less than (1−A) $\beta$ (step S15. YES), the process proceeds to step S16 to cause the ratio of the request packets 17 to be discarded to be closer to the target value (1−A).

In step S16, the change unit 28 changes the queuing time Th to the time shorter than the current queuing time.

Here, the change unit 28 changes the queuing time to the time that has the smallest difference from the current queuing time Th and is less than the current queuing time Th among a plurality of the queuing times $Th_1$, $Th_2$, and $Th_3$. For example, when the current queuing time is $Th_n$, the change unit 28 changes the queuing time to $Th_{n-1}$.

Then, the change unit 28 determines whether the queuing time Th after the change is equal to the minimum value $Th_{min}$ among a plurality of the queuing times (step S17). In the first embodiment. $Th_1$, which is the minimum value among $Th_1$, $Th_2$, and $T_3$, is $Th_{min}$.

When the queuing time Th is not equal to the minimum value $Th_{min}$ (step S17: NO), there is room to further decrease the queuing time, and therefore step S15 is executed again.

By contrast, when the queuing time Th is equal to the minimum value $Th_{min}$ (step S17: YES), it is impossible to further decrease the queuing time. Therefore, the process returns to the calling process.

According to the process for changing the queuing time described above, when the drop ratio DR is less than (1−A) $\beta$, the change unit 28 changes the queuing time to the value less than the current value. This appropriately controls the number of the request packets 17 to be discarded, thereby allowing the ratio of the request packets 17 to be discarded to be closer to the target value 1−A.

Furthermore, the response time of the system 11 is reduced by decreasing the queuing time as described above, the convenience for the participants of the system 11 is improved.

Furthermore, in step S17, the time having the smallest difference from the current queuing time Th among a plurality of the queuing times $Th_1$, $Th_2$ and $Th_3$ is set as a new queuing time. Thus, the rapid increase in the number of the request packets 17 to be discarded with the decrease in the queuing time is inhibited.

Second Embodiment

In the first embodiment, the queuing time is changed to a one-step longer time or a one-step shorter time in steps S12 and S16 of 12 and FIG. 13. In a second embodiment, the amount of change of the queuing time when the queuing time is first changed is made to be larger than that in the first embodiment.

Figure 14:
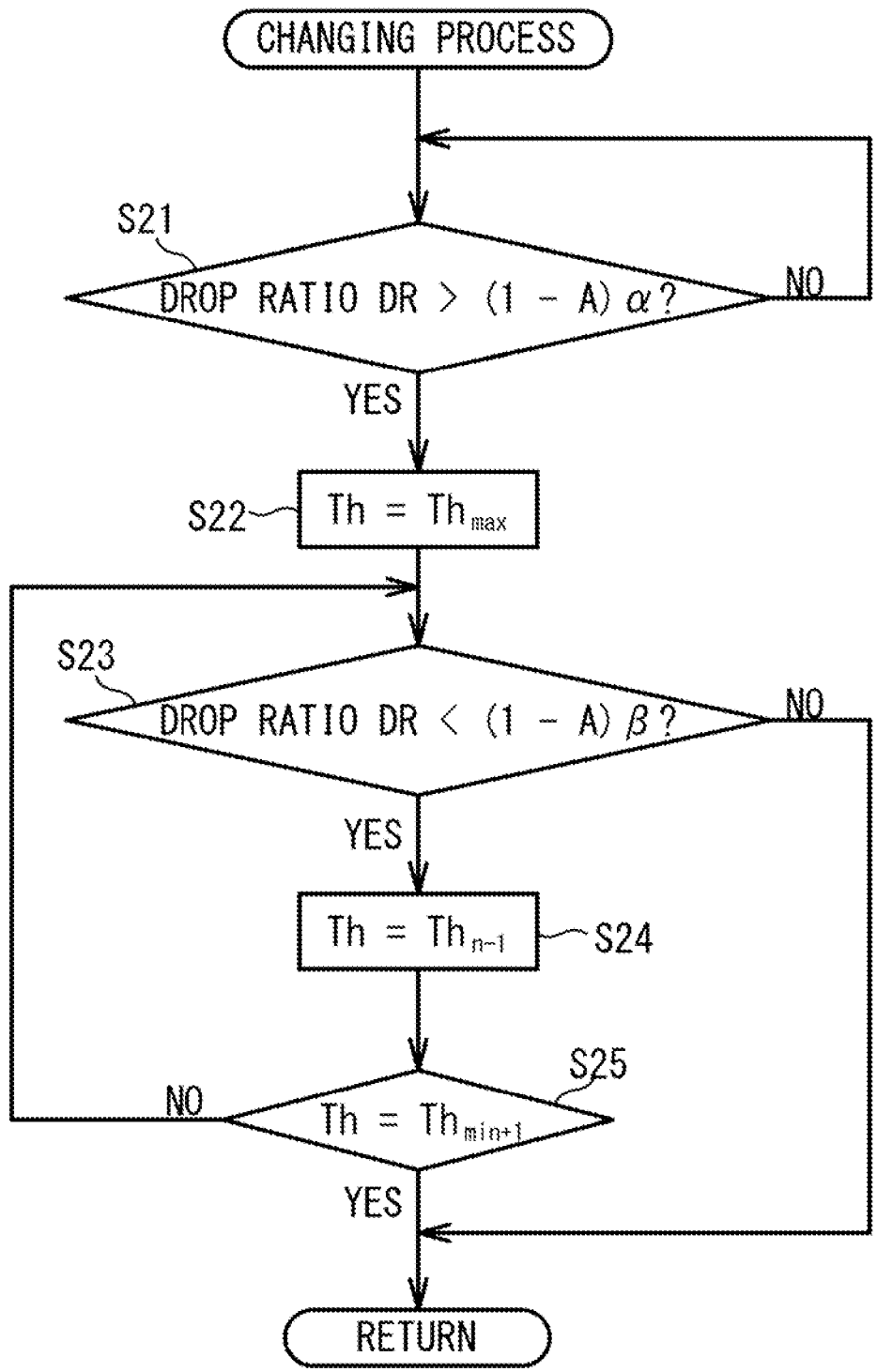
FIG. 14 is a flowchart of a process for changing the queuing time in accordance with a second embodiment.

FIG. 14 is a flowchart of a process for changing the queuing time in accordance with the second embodiment. This flowchart is a flowchart of the details of the changing process in step S8 in 11.

In the following description, the threshold value A and the coefficients α and β are used. Their meanings are the same as those described in the first embodiment, and the description thereof is thus omitted.

First, the change unit 28 determines whether the drop ratio DR is greater than (1−A) α (step S21).

When the drop ratio DR is not greater than (1−A) α (step S21: NO), this means that the ratio of the discarded request packets 17 is basically less than the target value 1−A, and the excessive discarding has not occurred. Therefore, in this case, step S21 is repeated without changing the queuing time.

By contrast, when the drop ratio DR is greater than (1−A) α (step S21: YES), the process proceeds to step S22 to cause the ratio of the request packets 17 to be discarded to be closer to the target value 1−A.

In step S22, the change unit 28 changes the queuing time Th to the maximum value $Th_{max}$ among a plurality of the queuing times $Th_1$, $Th_2$, and $Th_3$. As described in the first embodiment, the magnitude relationship of the queuing times is $Th_1 < Th_2 < Th_3$. Thus, the maximum value $Th_{max}$ is equal to $Th_3$.

When the queuing tune is set at the maximum value $Th_{max}$ in this manner in a single change, the number of the request packets 17 to be discarded can be largely reduced. However, the ratio of the request packets 17 to be discarded may become largely lower than the target value (1−A).

Thus, the change unit 28 determines whether the drop ratio DR is less than (1−A) β (step S23).

When the drop ratio DR is not less than (1−A) β (step S23: NO), this means that the ratio of the discarded request packets 17 is basically close to the target value 1−A. In this case, the number of the discarded request packets 17 is not excessively small, and therefore the process returns to the calling process without changing the queuing time.

By contrast, when the drop ratio DR is less than (1−A) β (step S23: YES), the process proceeds to step S24 to eliminate the situation where the number of the discarded request packets 17 is excessively small.

In step S24, the change unit 28 changes the queuing time Th to a one-step smaller value. For example, when the current queuing, time is $Th_a$, the change unit 28 changes the queuing time to $Th_{n-1}$.

This eliminates the situation where the number of the discarded request packets 17 is excessively small. Furthermore, since the queuing time decreases, the response time of the system 11 can be reduced.

Then, the change unit 28 determines whether the queuing time Th after the change is equal to $Th_{min+1}$ (step S25).

When the queuing time Th after the change is not equal to $Th_{min+1}$ (step S25: NO), there is room to decrease the queuing time to a one-step smaller value in step S24. Thus, in this case, the process returns to step S23.

By contrast, when the queuing time Th after the change is equal to $Th_{min+1}$ (step S25: YES), the process returns to the calling process.

In the second embodiment described above, the queuing time is changed to the maximum value. $Th_{max}$ in step S22, it is possible to largely decrease the number of the request packets 17 to be discarded.

In addition, when this causes the number of the discarded request packets 17 to be excessively small, the queuing time is changed to a one-step smaller value in step S24. This allows the ratio of the request packets 17 to be discarded to be closer to the target value 1−A, and allows appropriate control of the number of the request packets 17 to be discarded. Furthermore, such a reduction in queuing time allows the reduction in response time of the system 11.

In the example of FIG. 14, the queuing time is changed when the number of the discarded request packets 17 is large, but the queuing time may be also changed when the number of the discarded request packets 17 is small as described below.

Figure 15:
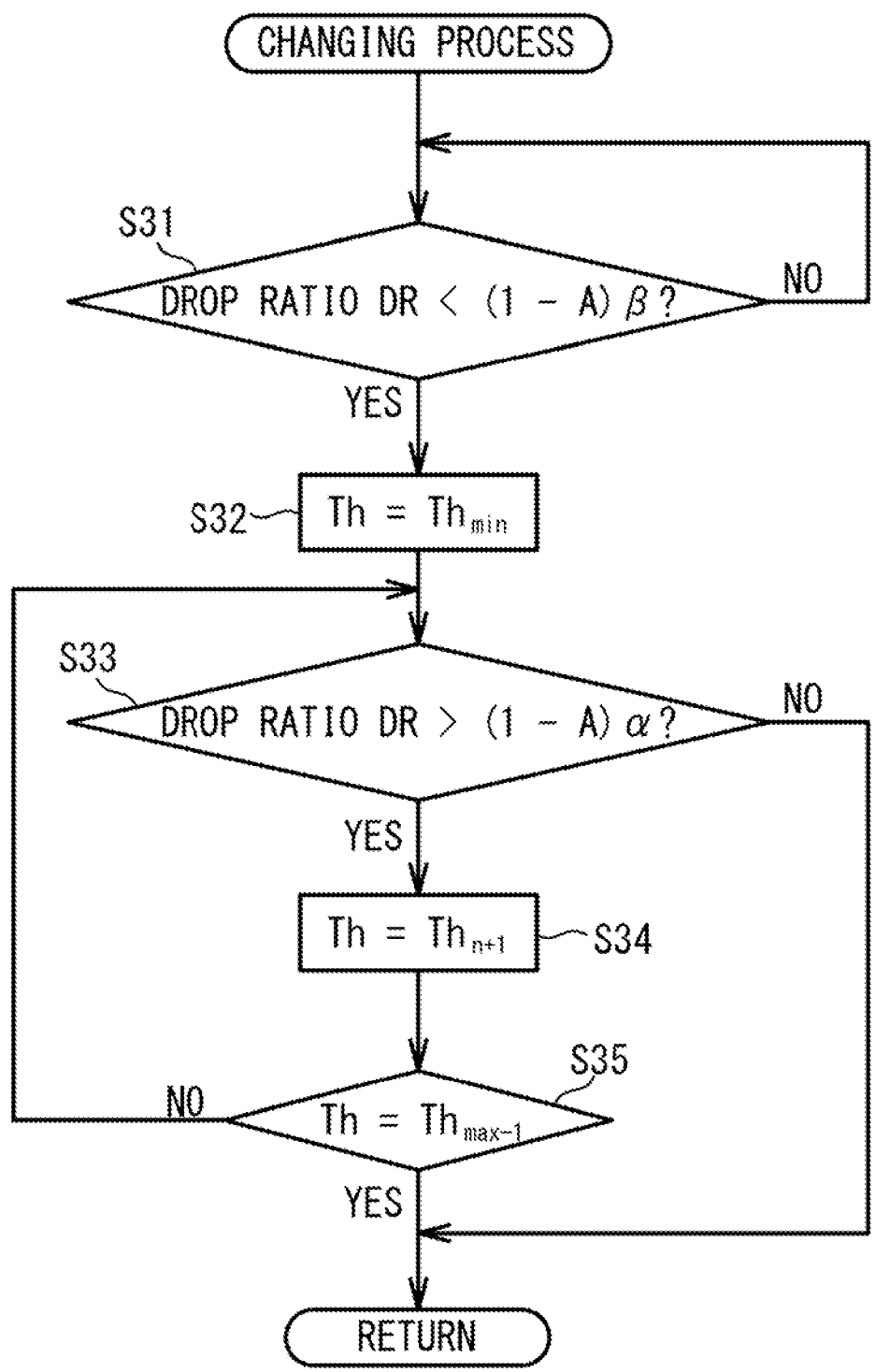
FIG. 15 is a flowchart of another process for changing the queuing time in the second embodiment.

FIG. 15 is a flowchart of another process for changing the queuing time in accordance with the second embodiment.

First, the change unit 28 determines whether the drop ratio DR is less than (1−A) β (step S31).

When the drop ratio DR is not less than (1−A) β (step S31: NO), this means that the drop ratio DR is basically greater than the target value 1−A. In this case, the number of the discarded request packets 17 is not excessively small. Therefore, step S31 is repeated without changing the queuing time.

By contrast, when the drop ratio DR is less than (1−A) β (step S31: YES), the process proceeds to step S32 to cause the ratio of the request packets 17 to be discarded to be closer to the target value 1−A.

In step S32, the change unit 28 changes the queuing time to the minimum value $Th_{min}$ of the queuing times $Th_1$, $Th_2$, and $Th_3$. Since the magnitude relationship of the queuing times is $Th_1 < Th_2 < Th_3$, the minimum value $Th_{min}$ is equal to $Th_1$.

When the queuing time is set at the minimum value $Th_{min}$ in this manner in a single change, the number of the request packets 17 to be discarded largely increases, and the possibility for the ratio of the request packets 17 to be discarded to be closer to the target value 1−A increases.

However, the ratio of the discarded request packets 17 may become largely greater than the target ratio (1−A).

Therefore, the change unit 28 determines whether the drop ratio DR is greater than (1−A) α (step S33).

When the drop ratio DR is not greater than (1−A) α (step S33: NO), this means that the ratio of the discarded request packets 17 is close to the target value 1−A. In this case, the number of the discarded request packets 17 is not excessively large. Therefore, the process returns to the calling process without changing the queuing time.

By contrast, when the drop ratio DR is greater than (1−A) α (step S33: YES), the process proceeds to step S34 to inhibit the request packets 17 from being excessively discarded.

In step S34, the change unit 28 changes the queuing time Th to a one-step larger value. For example, when the current queuing time is $Th_a$, the change unit 28 changes the queuing time to $Th_{n+1}$.

This inhibits excessive discarding of the request packets 17.

Then, the change unit 28 determines whether the queuing time Th after the change is equal to $Th_{max-1}$ (step S35).

When the queuing time Th after the change is not equal to $Th_{max-3}$ (step S35: NO), there is room to increase the queuing time to a one-step larger value in step S34. In this case, the process returns to step S33.

By contrast, when the queuing time Th after the change is equal to $Th_{max-1}$ step S35: NO), the process returns to the calling process.

In the second embodiment described above, the queuing time is changed to the minimum value $Th_{min}$ in step S32, and therefore the number of the request packets 17 to be discarded largely increases. As a result, the possibility for the ratio of the request packets 17 to be discarded to be closer to the target value 1−A is increased by a single change of the queuing time, and the number of the request packets 17 to be discarded can be appropriately controlled.

In addition, when this causes the number of the discarded request packets 17 to be excessively large, the queuing time is increased to a one-step larger value in step S34. This allows the ratio of the request packets 17 to be discarded to be further closer to the target value 1−A.

Third Embodiment

In a third embodiment when the queuing time needs to be changed, a new frequency distribution is generated by counting the request packets 17 for each latency, and a new queuing time based on the newly generated frequency distribution is set.

Figure 16:
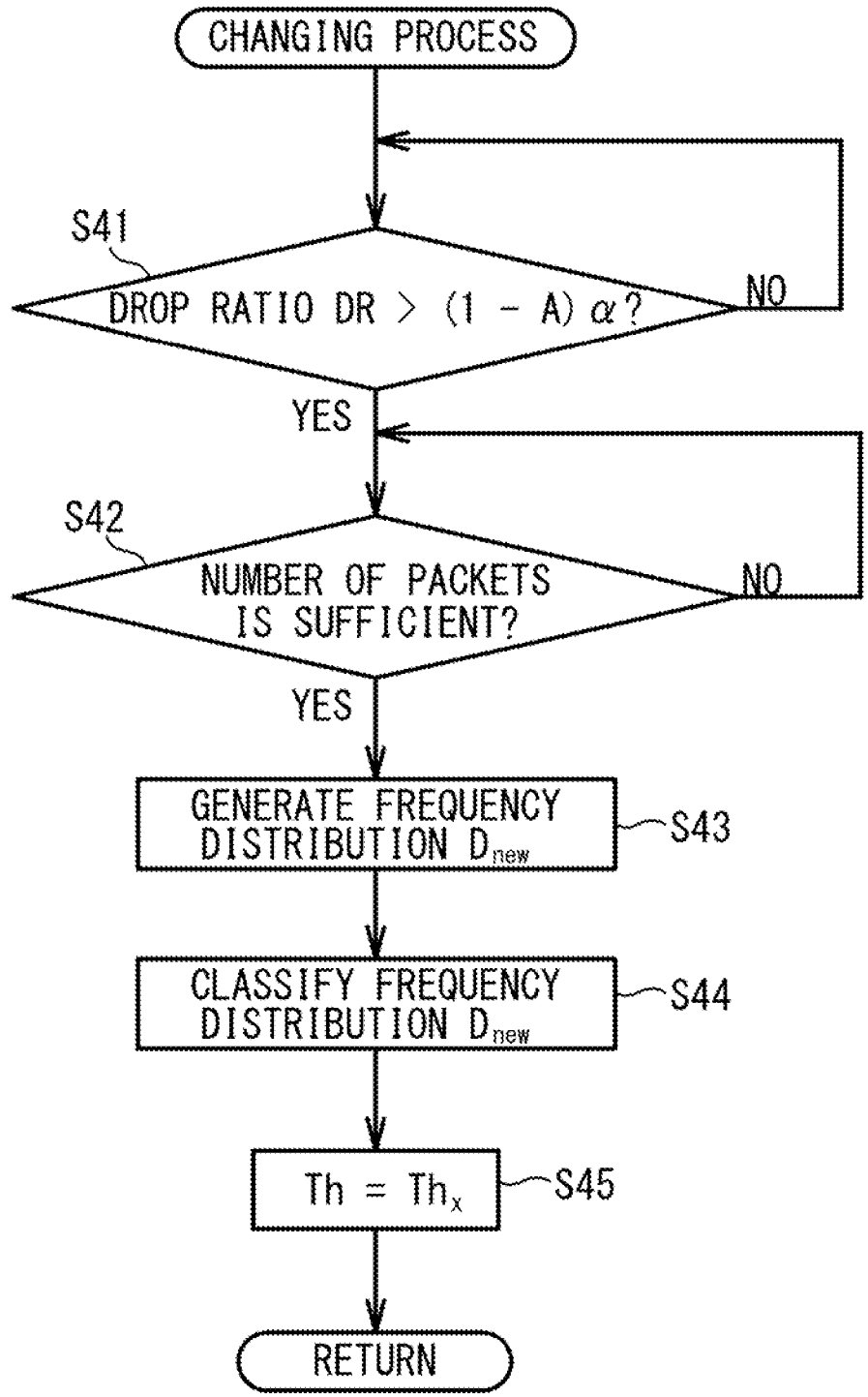
FIG. 16 is a flowchart of a process for changing the queuing time in accordance with a third embodiment.

FIG. 16 is a flowchart of a process for changing the queuing time in accordance with the third embodiment. This flowchart is a flowchart of the details of the changing process in step S8 of FIG. 11.

In the following description, the threshold value A and the coefficients α and β are used. Their meanings are the same as those described in the first embodiment, and the description thereof is thus omitted.

First, the change unit 28 determines whether the drop ratio DR is greater than (1−A) α (step S41). When the drop ratio DR is not greater than (1−A) α (step S41: NO), this means that the ratio of the discarded request packets 17 is basically less than the target value 1−A, and excessive discarding has not occurred. In this case, step S41 is repeated.

By contrast, when the drop ratio DR is greater than (1−A) α (step S41: YES), the process proceeds to step S42 to cause the ratio of the request packets 17 to be discarded to be closer to the target value 1−A.

In step S42, the change unit 28 determines whether the number of the request packets 17 received by the processing server 14 within the period from when it is determined that the drop ratio DR is greater than (1−A) α in step S41 to the current time is sufficient. Whether the number of the request packets 17 is sufficient is determined in terms of whether a frequency distribution can be generated using these packets. For example, the number of the request packets 17 required to generate the frequency distribution is determined as the threshold value, and the change unit 28 can determine that the number of the request packets 17 is sufficient when the number of the request packets 17 is greater than the threshold value.

When the number of the request packets 17 is insufficient (Step S42: NO), the request packets 17 are accumulated by repeating step S42.

On the other hand, when the number of the request packets 17 is sufficient (step S42: YES), the process proceeds to step S43.

In step S43, the generation unit 29 generates a new frequency distribution $D_{new}$ by counting the request packets 17 for each latency. The new frequency distribution $D_{new}$ is an example of a fourth frequency distribution. The request packets 17 for generating the frequency distribution $D_{new}$ are the request packets 17 received by the processing server 14 after it is determined that the drop ratio DR is greater than (1−A) α in step S41.

Then, the classification unit 30 classifies the new frequency distribution $D_{new}$ into one of three classes, that for low load, middle load, and high load respectively represented by the frequency distributions $D_L$, $D_M$, and $D_H$ illustrated in FIG. 7A to FIG. 7C (step S44). For example, the classification unit 30 identifies the class of which the average value and the distribution are the same as those of the new frequency distribution $D_{new}$ using the t-test and the F-test, and classifies the frequency distribution $D_{new}$ into the identified class.

Then, the change unit 28 changes the queuing time Th to the queuing time $TH_x$ that is determined from the frequency distribution representing the class to which the new frequency distribution $D_{new}$ belongs (step S45). For example, when the frequency distribution representing the class to which the frequency distribution $D_{new}$ belongs is the frequency distribution $D_L$ illustrated in FIG. 7A, the queuing time $Th_x$ becomes $Th_1$. Similarly, when the frequency distribution representing the class to which the new frequency distribution $D_{new}$ belongs is the frequency distribution $D_M$ illustrated in FIG. 7B, the queuing time $Th_x$ becomes $Th_2$ and when the frequency distribution representing the class to which the new frequency distribution $D_{new}$ belongs is the frequency distribution $D_H$ illustrated in FIG. 7C, the queuing time $Th_x$ becomes $Th_3$. Note that the queuing time $Th_x$ is an example of a third latency.

Thereafter, the process returns to the calling process, and the basic steps of process for changing the queuing time in accordance with the third embodiment ends.

According to the request processing method, when it is determined that the drop ratio DR is greater than (1−A) α in step S41, the new frequency distribution $D_{new}$ is generated in step S43. Then, in step S45, the queuing time is changed to the queuing time $Th_x$ of the class to which the frequency distribution $D_{new}$ belongs.

The queuing time $Th_x$ is the value that most closely reflects the frequency distribution $D_{new}$ of the latencies of the request packets 17 actually arriving at the processing server 14 among $Th_1$, $Th_2$, and $Th_3$. Thus, it is possible to cause the drop ratio DR to be closer to the target value 1−A by a single change of the queuing time in step S45.

In FIG. 16, a case where the queuing time is changed when the number of the discarded request packets 17 is large, but the queuing time may be also changed when the number of the discarded request packets is small as described below.

Figure 17:
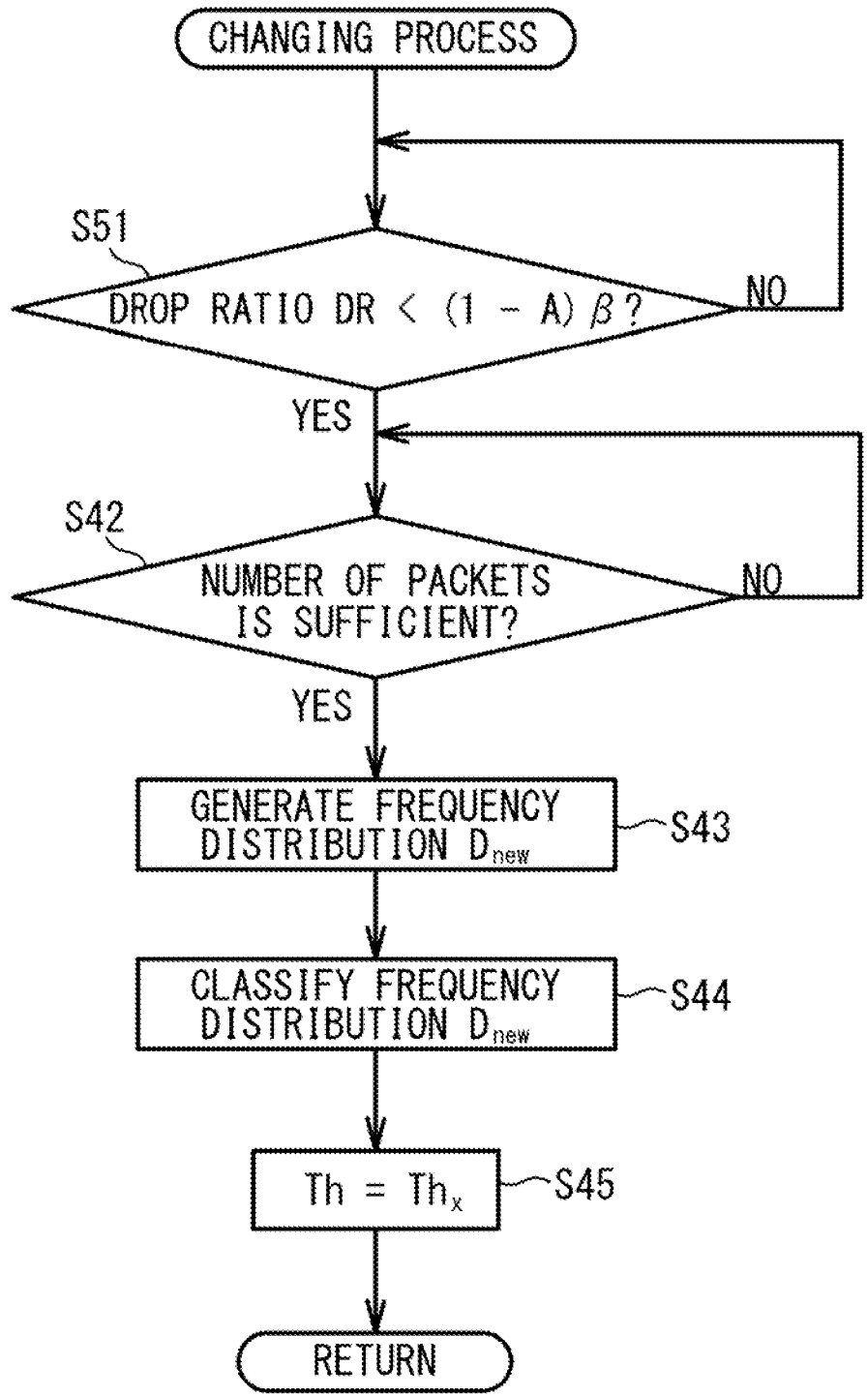
FIG. 17 is a flowchart of another process for changing the queuing time in the third embodiment.

FIG. 17 is a flowchart of another process for changing the queuing time in accordance with the third embodiment.

First, the change unit 28 determines whether the drop ratio DR is less than (1–A) β (step S51). When the drop ratio DR is not less than (1–A) β (step S51: NO), step S51 is repeated.

By contrast, when the drop ratio DR is less than (1–A) β (step S51: YES), steps S42 to S45 described in FIG. 16 are executed to change the queuing time, and the process returns to the calling process.

As in the example of FIG. 16, the queuing time Th is changed to the queuing time $Th_x$ that most closely reflects the frequency distribution $D_{new}$ of the latencies of the request packets 17 actually arriving at the processing server 14. Therefore, it is possible to cause the drop ratio DR to be closer to the target value 1–A by a single change of the queuing time in step S45.

Hardware Configuration

Next, a description will be given of the hardware configuration of the processing server 14 in accordance with the first to third embodiments.

Figure 18:
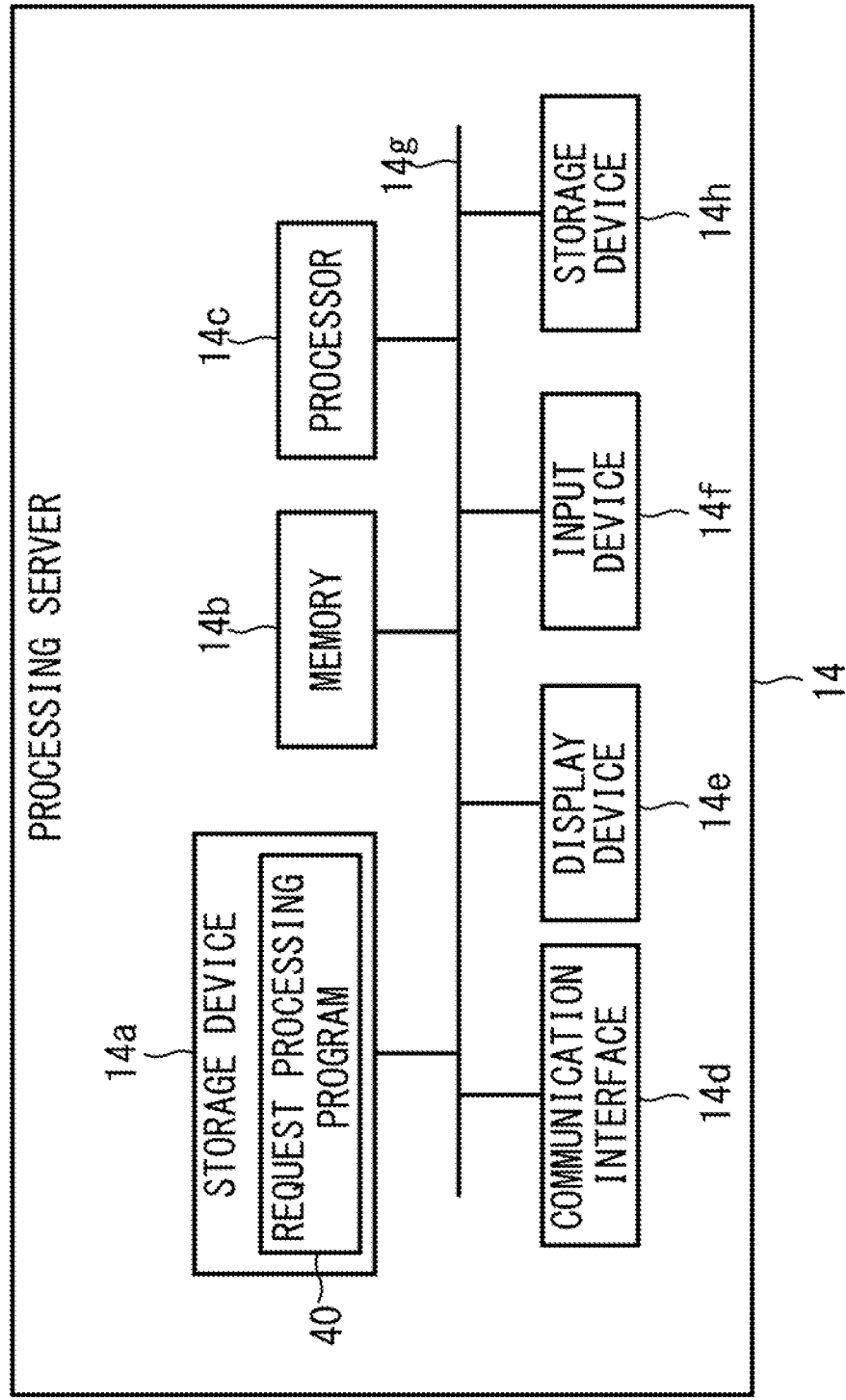
FIG. 18 is a hardware confirmation diagram of the processing servers in the first to third embodiments.

FIG. 18 is a hardware configuration diagram of the processing server 14 in accordance with the first to third embodiments.

As illustrated in FIG. 18, the processing server 14 includes a storage device 14a, a memory 14b, a processor 14c, a communication interface 14d, a display device 14e, and an input device 14f. These components are interconnected through a bus 14g.

The storage device 14a is a iron-volatile storage such as a hard disk drive (HDD) or a solid-state drive (SSD), and stores a request processing program 40 in accordance with the present embodiments.

Note that the request processing program 40 may be stored in a computer-readable storage medium 14h, and the processor 14c may be caused to read the request processing program 40 stored in the storage medium 14h.

Examples of the storage medium 14h include a physical portable storage medium such as a compact disc-read only memory (CD-ROM), a digital versatile disc (DVD), and a universal serial bus (USB) memory. Alternatively, a semiconductor memory such as a flash memory or a hard disk drive may be used as the storage medium 14h. These storage media 14h are not temporal storage media such as carrier waves that have no physical form.

Yet alternatively, the request processing program 40 may be stored in a device connected to a public network, the Internet, or a local area network (LAN), and the processor 14c may read the request processing program 40 and execute it.

The memory 14b is a hardware device, such as a dynamic random-access memory (DRAM), that temporarily stores data, and the request processing program 40 is expanded on the memory 14b.

The processor 14c is a hardware device such as a central processing unit (CPU) or a graphical processing, unit (CPU) that controls each component of the processing server 14. The processor 14c executes the request processing program 40 in cooperation with the memory 14b.

The control unit 23 of FIG. 10 is implemented by the memory 14b and the processor 14c cooperatively executing the request processing program 40. The control unit 23 includes the processing units including the buffer unit 24, the sorting unit 25, the processing execution unit 26, the discarding unit 27, the change unit 28, the generation unit 29, and the classification unit 30. The storage unit 22 is implemented by the storage device 14a and the memory 14b in FIG. 10.

The communication interface 14d is a communication interface such as a network interface card (NIC) for connecting the processing, server 14 to the network 13 see FIG. 4). The receive unit 21 of FIG. 10 is implemented by the communication interface 14d.

The display device 14e is a hardware device such as a liquid crystal display device, and display's various information to the administrator of the system 11. The input device 14f is a hardware device such as a keyboard and a mouse. For example, the administrator can issue various instructions to the processing server 14 by operating the input device 14f.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed:

1. A non-transitory computer-readable storage medium storing a request processing program causing a first information processing device, which is connected to a second information processing device through a network, to execute a process, the process comprising:

receiving requests each having a timestamp added by the second information processing device;

storing, as a first time, a first latency for which a cumulative frequency in a first frequency distribution is equal to a threshold value, the first frequency distribution being obtained by counting the requests for each latency, the latency being a difference between a time when the request is received and a time indicated by the timestamp;

processing the requests received within the first time in order of time indicated by the timestamp;

discarding the request having a latency greater than the first time; and changing the first time to a second latency for which a cumulative frequency in a second frequency distribution is equal to the threshold value in response to determining that a ratio of discarded requests among the requests received is greater than a target value calculated by subtracting the threshold value from 1, the second frequency distribution differing from the first frequency distribution.

2. The non-transitory computer-readable storage medium according to claim 1, wherein:

the process further includes generating the second frequency distribution in plural, the second frequency distributions being different from each other, and storing the first time in plural, each of the first times corresponding to one of the second frequency distributions; and the changing of the first time includes changing the first time to a time having a smallest difference from a current first time among the first times.

3. The non-transitory computer-readable storage medium according to claim 1, wherein:

the process further includes generating the second frequency distribution in plural, the second frequency distributions being different from each other, and storing the first time in plural, each of the first times corresponding to one of the second frequency distributions; and the changing of the first time includes changing the first time to a maximum value or a minimum value among the first times.

4. The non-transitory computer-readable storage medium according to claim 3, wherein the changing of the first time includes, when the ratio of the discarded requests is less than the target value after the first time is changed to the maximum value, changing the first time to a time having a smallest difference from the maximum value among the first times.

5. The non-transitory computer-readable storage medium according to claim 3, wherein the changing of the first time includes, when the ratio of the discarded requests is greater than the target value after the first time is changed to the minimum value, changing the first time to a time having a smallest difference from the minimum value among the first times.

6. The non-transitory computer-readable storage medium according to claim 3, wherein the process further includes:

counting the requests received within each of time periods for each latency to generate third frequency distributions that include the first frequency distribution and the second frequency distributions for each of the time periods; and classifying the third frequency distributions generated into a plurality of classes, and storing a latency for which a cumulative frequency in the third frequency distribution representing each of the classes is equal to the threshold value as one of the first times.

7. The non-transitory computer-readable storage medium according to claim 6, wherein the process further includes:

generating a fourth frequency distribution by counting the requests received for each latency after the ratio of the discarded requests becomes greater than the target value; and setting, as the first time, a third latency for which a cumulative frequency in a frequency distribution representing a class to which the fourth frequency distribution belongs is equal to the threshold value.

8. The non-transitory computer-readable storage medium according to claim 6, wherein the process further includes:

generating a fourth frequency distribution by counting the requests received for each latency after the ratio of the discarded requests becomes less than the target value; and setting, as the first time, a third latency for which a cumulative frequency in a frequency distribution representing a class to which the fourth frequency distribution belongs is equal to the threshold value.

9. A request processing method implemented by a first information processing device connected to a second processing device through a network, the request processing method comprising:

receiving requests each having a timestamp added by the second information processing device;

storing, as a first time, a first latency for which a cumulative frequency in a first frequency distribution is equal to a threshold value, the first frequency distribution being obtained by counting the requests for each latency, the latency being a difference between a time when the request is received and a time indicated by the timestamp;

processing the requests received within the first time in order of time indicated by the timestamp;

discarding the request having a latency greater than the first time; and changing the first time to a second latency for which a cumulative frequency in a second frequency distribution is equal to the threshold value in response to determining that a ratio of discarded requests among the requests received is greater than a target value calculated by subtracting the threshold value from 1, the second frequency distribution differing from the first frequency distribution.

10. An information processing device comprising:

a memory; and a processor coupled to the memory and configured to:

receive requests through a network, a timestamp being added to each of the requests by another information processing device;

store, as a first time, a first latency for which a cumulative frequency in a first frequency distribution is equal to a threshold value, the first frequency distribution being obtained by counting the requests for each latency, the latency being a difference between a time when the request is received and a time indicated by the timestamp;

process the requests received within the first time in order of time indicated by the timestamp;

discard a request having a latency greater than the queuing time; and change the first time to a second latency for which a cumulative frequency in a second frequency distribution is equal to the threshold value in response to determining that a ratio of discarded requests among the requests received is greater than a target value calculated by subtracting the threshold value from 1, the second frequency distribution differing from the frequency distribution.

\* \* \* \* \*